UNITED STATES PATENT OFFICE.

GEORGE I. STEVENS, OF BROOKLYN, ASSIGNOR TO THE AVERILL PAINT COMPANY, OF NEW YORK, N. Y.

IMPROVEMENT IN DISTEMPER PAINTS.

Specification forming part of Letters Patent No. 200,228, dated February 12, 1878; application filed December 7, 1877.

*To all whom it may concern:*

Be it known that I, GEORGE I. STEVENS, of the city of Brooklyn, county of Kings, and State of New York, have invented a new and useful Improvement in the Preparation of Calcimine or Distemper Paint; and I hereby declare that the following is a full, clear, and exact description thereof, to enable others skilled in the art to make and use the same.

The object of this invention is to prepare and present to the trade a calcimine or distemper paint in rigid and convenient forms, of various shapes and weights, so that the same may be safely and inexpensively put up, ready for immediate use by the addition of water.

In carrying out my invention, I take paris-white, china-clay, zinc, or other known materials employed as a base for this purpose, and add to either, or all combined, a sufficient quantity of glue or other substance to cause the mixture to adhere to the surface painted. I then grind said mixture together with as little water as possible, and add any coloring pigment desired. After this part of the process is completed, the mixture is formed into any desired shape by pressure or otherwise, and dried in any well-known manner. In this form, and in definite and various weights, the article may be put up in suitable packages ready for the trade, and only needs the application of water to dissolve and render it ready for use.

Hot or cold water may be used; but the former is preferable, as it dissolves the substance much quicker than the latter.

I am thus enabled to present to the trade an improved article of commercial value, as in the form claimed damage and expense by transportation is avoided, and convenience for immediate use secured.

Having thus fully described my invention, I wish it to be understood that I am aware that calcimine has been prepared for the trade in the form of a powder, and accompanied by a binding material put up in a separate package; and I am also aware that water-colors containing a binding material are made and offered for sale in the form of cakes; but

What I claim, and desire to secure by Letters Patent, is—

A prepared dry calcimine or distemper paint to which the proper quantity of binding material has been added, and the whole made or compressed into the form of a cake, tablet, ball, or other shape, as an improved article of manufacture.

GEORGE I. STEVENS.

Witnesses:
   E. W. BARD,
   JOHN W. KELLY.